Figure 1:
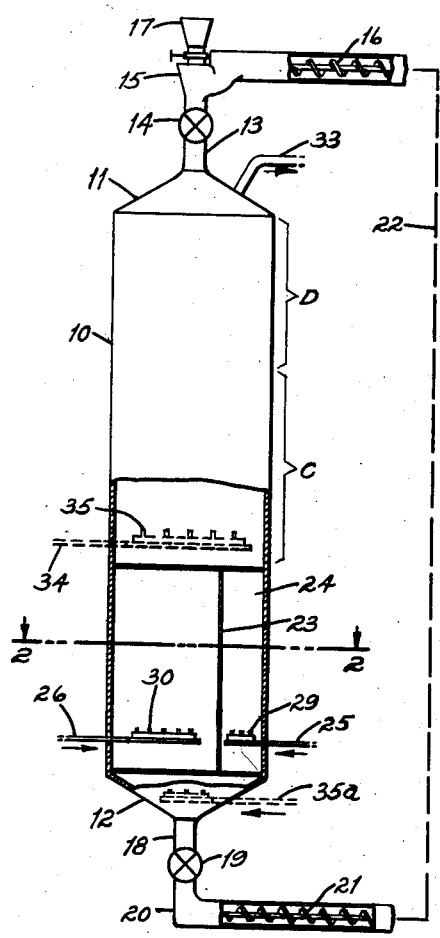

June 16, 1953 P. C. KEITH 2,642,346
PROCESS AND APPARATUS FOR EXOTHERMIC REACTIONS
Filed Sept. 28, 1946

INVENTOR.
PERCIVAL C. KEITH
BY
Daniel Stryker
Attorney

Patented June 16, 1953

2,642,346

UNITED STATES PATENT OFFICE 2,642,346

PROCESS AND APPARATUS FOR EXOTHERMIC REACTIONS

Percival C. Keith, Peapack, N. J., assignor to Hydrocarbon Research, Inc., New York, N. Y., a corporation of New Jersey Application September 28, 1946, Serial No. 700,019

6 Claims. (Cl. 48—196)

The present invention relates to relatively high temperature exothermic reactions and is more particularly concerned with the continuous manufacture of gaseous products by the interaction of exothermically reacting materials including one or more gases which advantageously require the efficient utilization of available heat in order to assure maintenance of a desirable high temperature of the reaction.

While the invention, for purposes of convenience will be described more particularly in connection with the preferred preparation of synthesis gas from hydrocarbons, and other conventional reactants, nevertheless it will be understood that the principles thereof are equally applicable to equivalent exothermic processes involving gaseous reactants, wherein relatively high temperature of reaction must be maintained.

While the interaction of methane or other hydrocarbon and an oxygen-containing gas is more or less strongly exothermic I have found that this reaction, whether carried out in the presence of catalyst or an inert granular material, is desirably operated at relatively high temperatures in the neighborhood for instance of 2000°–2500° F. or in some cases even as high as 3000° F. or higher.

Theoretically, efficient and economic operation of the process requires the quantative yield, from appropriate mixtures of methane and oxygen, of a product containing approximately 2 mol parts of hydrogen to 1 mol part of carbon monoxide. Optimum high temperatures of operation should be ensured if this desired objective is to be approached. Moreover, in accordance with conventional practice the reactants may and normally do include appropriate additions of water vapor or carbon dioxide, or both, in the fresh feed gases. These products, however, react endothermically with the methane. This together with the constant discharge of reaction products from the reaction zone at high temperature, and the other heat losses normally involved in such a high temperature system, frequently make it difficult to maintain the optimum temperature in the reaction or generation zone. In any case, heat losses are a measure of the thermal inefficiency of the operation.

It is, of course, possible to preheat the gases but expenditure of additional heat energy is economically objectionable. Moreover, the sensible heat in the reaction products is only difficultly exchangeable with the incoming reactants due to its extremely high temperature and the necessity for cumbersome and expensive equipment in handling the relatively large volumes of gas involved, and particularly in view of the advisability, for reasons of safety, of preventing admixture of the reactants in combustible proportions prior to the vicinity of the reaction zone. Conventional regenerative systems involve one or more of these objections.

It is, therefore, an important object of the present invention to provide for the exothermic reaction of materials, at least some of which are in gasiform state, under such conditions as to effect a good utilization of the exothermic energy in preheating of one or preferably a plurality of the gaseous reactants. Another object contemplates a process as above, operable to exchange heat not only from the reaction zone itself but from the heated products of reaction whereby the products are discharged at a temperature below reaction temperature and thus better adapted to subsequent handling and utilization. Yet another object contemplates the provision of means capable of achieving the foregoing objectives, in relatively compact and simple form and which may form a part of the reaction or regeneration chamber, whereby to eliminate, in large measure, the necessity for additional and bulky heat exchange equipment. Other objects will be apparent from consideration of the following specification wherein the invention is described and illustrated in greater detail.

The invention more particularly involves the exothermic reaction of a plurality of reactants, at least one of which is in the gaseous form, in the presence of a heat carrier or thermophore cyclically circulated in countercurrent relation through the reactants in a path including a feed preheating zone, a reaction zone and a reaction product cooling zone. In its preferred aspect, the invention involves use of a plurality of reactant gases which are preheated either separately or in separate non-combustible admixtures in the preheating zone, being delivered separately into the reaction or gas generation zone in proportion appropriate for efficient completion of the reaction. Advantageously a zone thereabove permits the transfer of sensible heat from the hot reaction products to the circulating thermophore.

It is apparent from the foregoing that the invention contemplates reaction of a plurality of materials with a net exothermic liberation of heat energy. While this demands the presence of suitable exothermically reacting feed materials, it does not exclude the use of minor proportions of reactants which do not contribute to the net exothermic heat effect, and in fact may detract therefrom. In other words the invention contemplates, and in fact permits, the use of substantial proportions of reactants which overall, utilize energy in the reaction, and in the exothermic oxidation of synthesis gas, for example, permits use of carbon dioxide and steam as indicated above. This has the accompanying advantages of permitting good utilization of excess process gases and permits good control and adjustment of the relative proportions of hydrogen and carbon monoxide in the synthesis gas. In short, these reactants can be added in controlled, relative quantities, as is known, to produce a product wherein the $H_2:CO$ ratio varies in a predetermined manner from the ratio of 2:1 characteristic of such a gas produced from methane and oxygen. When so operating both the sensible heat of the reaction gases and the heat of reaction are largely absorbed and transported by the circulating thermophore or heat carrier to supply heat energy to the incoming feed gases and in turn maintain optimum temperature in the reaction or gas generation zone.

Figure 3:
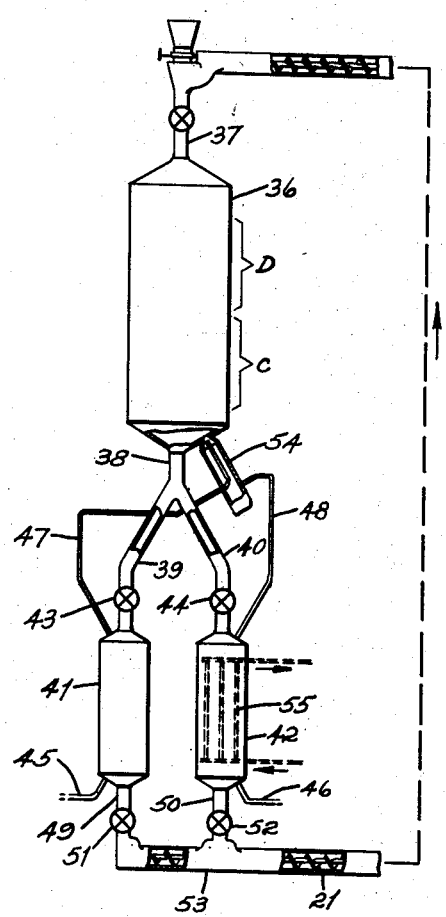
Figure 2:
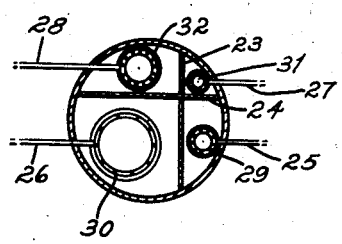

In order to describe the invention more in detail reference is made to the accompanying drawing wherein Fig. 1 illustrates more or less diagrammatically a gas generator, largely in section, embodying the principles of the present invention; Fig. 2 is a horizontal section taken through the gas generator of Fig. 1 on the line A—A thereof; and Fig. 3 is a more or less diagrammatic elevation showing an alternative type of arrangement.

Referring particularly to Fig. 1, the numeral 10 represents a gas generator of vertically extending, cylindrical form having frusto conical upper and lower end walls, 11 and 12, respectively. The chamber 10 is provided continuously with a downwardly moving charge of thermophore maintained at a predetermined upper level by means of an inlet standpipe 13, supplied at any predetermined rate by a suitable feeder 14 which may be a star feeder or any other conventional type of device adapted to feed solid particles at a controlled rate. The feeder 14 derives its supply of thermophore from the communicating hopper 15 supplied by a screw feeder 16. Additional valve controlled hopper means 17 permits introduction of thermophore to the system. The bottom extremity of the chamber 10 is similarly provided with an outlet standpipe 18 controlled by a second mechanical feeder 19 discharging into the hopper 20 which in turn supplies screw feeder 21. The screw feeder 21 conveys the discharged thermophore laterally to an elevator 22 or lift, of any suitable construction, for return to the upper screw hopper 16 whereby the thermophore can be maintained in a state of continual cyclic circulation through the generator. Obviously its rate of circulation and the level in the chamber 10 is readily adjustable in accordance with the coordinated rate of operation of the several feeders and conveyors, and the quantity of thermophore employed.

Internally the generator is separated at its lower portion into a plurality of axially extending passages by a pair of intersecting walls 23 and 24 shown more clearly in Figs. 1 and 2. The passageways thus provided are open at their top and bottom extremities so that the thermophore passes downwardly freely therethrough in separate streams. Thus, the walls 23 and 24 terminate substantially above the lower extremity of the generator so that the several streams of thermophore from the passages emerge together in a common zone for removal through outlet pipe 18.

Means is provided for introducing separate gases or mixtures of gases in each of the upwardly extending passageways. Such means, in the embodiment disclosed, comprises four separate gas inlet pipes 25, 26, 27 and 28, each supplying the gas or the fluid from a source not disclosed to a distributing head, respectively designated by the reference numerals 29, 30, 31 and 32. The heads advantageously are disposed somewhat above the lower extremity of the several passages whereby the gases pass individually upwardly within their respective passages free from admixture and are discharged from the upper extremities into the zone thereabove. In this zone they commingle at reaction temperature and the products are ultimately withdrawn from the upper extremity of the generator through outlet pipe 33. In this way, particularly where the several gases are introduced at substantially the same pressure, the flows pass upwardly in separate chambers so that there is no mixing of the gases in the lower portion of the generator and intermixing is prevented in advance of the reaction zone.

In operation it will be understood that an appropriate stream of a suitable solid, refractory thermophore is circulated at any predetermined rate downwardly through the generator, the reactant gases, supplied through the several inlet pipes, passing upwardly in countercurrent relationship thereto and reacting in the region just above the upper margin of the plates 23 and 24. For purposes of illustration it will be assumed that the reaction is completed within the zone approximately indicated by the bracket C where the thermophore becomes heated to a high temperature by the exothermic reaction going on therein. Obviously this heated thermophore subsequently moving downwardly into the several passageways, defined by the partitions 23 and 24, preheats the incoming streams of gas to a temperature closely approximating reaction temperature or to any other desired level. It is furthermore important to note that the invention provides a zone above the reaction zone C, designated by the bracket D, wherein the relatively cool incoming thermophore absorbs the sensible heat of the gaseous reaction products and thus flows into the reaction zone C at a high temperature suitable for the reaction.

With the foregoing apparatus it will be understood that the temperature of the reaction zone may be predetermined and maintained within a wide range of available temperatures by appropriate control of the rate of thermophore flow and by appropriate proportioning of the thermophore preheating zone D and the vertical extent of the gas preheating passages. It is further important to note that the gas preheating passages may be varied widely in number and relative size in accordance with the number of feed gases employed and the relative rate of feed of each. Thus, as will be apparent to one skilled in the art in the light of the foregoing, the relative area of each of the gas preheating passages should approximate the relative rate of feed of the specific gas introduced through this passageway. Thus it will be noted that the lower left hand passageway illustrated in Fig. 2 has a horizontal sectional area substantially greater than the other passageways and is thus properly proportioned for handling the incoming stream of methane. The upper passageway of somewhat less sectional area may, for example, accommodate the supply of oxygen. The remaining two passageways are proportioned to accommodate the relative lesser flows of steam and carbon dioxide.

So also the area of the passageways may be selected with a view to preheating the several gaseous streams to relatively different respective temperatures, where such is advisable. Thus in order to prevent undesired thermal decomposition of methane or other light hydrocarbon where extraordinarily high temperatures prevail in the reaction, the cross-sectional area and/or length of the respective preheating passage may be appropriately selected by one skilled in the art so that the temperature increase is limited to any preselected maximum.

So also any one of the several gaseous feeds may be introduced to the generation zone without preheating, if desired, or any such stream may be preheated in separate preheating means or by indirect exchange with any of the several heated streams of material including the thermophore itself. In addition, an extraneous fluid may be used to add or remove heat. For example, excess heat of reaction may be withdrawn from the system by circulating a coolant through coils or tubes disposed in the moving mass of thermophore. Such a heat exchange means is schematically shown as a tube bundle 55 in chamber 42 (Fig. 3) hereinafter described. Thus, tube bundle 55 may be used to remove heat by generating steam.

The term thermophore as used herein means particles, granules, spheres, or any other suitable shape or form of solid material, preferably of good heat absorptive properties. At the substantial temperatures normally prevailing in the synthesis gas generation reaction, for example, it is essential that the thermophore be a suitable refractory material such as, for example, silica, carborundum, alundum, zirconia, magnesia, fire clay or the like. Obviously the specific material will be selected in view of the temperature conditions prevailing in the reaction zone and it is advantageous to provide particles, shapes, or forms having rounded surfaces or otherwise so configurated as to permit easy handling and promote relatively regular flow of the particles by the conveyors and downwardly in the chamber 10. The thermophore must also be of a material which is unreactive under service conditions, excluding, however, desired catalytic effects.

The size of the particles does not otherwise appear to be critical in processes operated under optimum conditions such that carbon formation is inhibited. The particles should preferably be of such size that the resistance to the flow of gases up therethrough is small.

It is particularly important to point out that the present process will tolerate a small rate of carbon deposition which would be highly objectionable in any other process, due to the purging effect in the oxygen preheating passageway. In other words the continual circulation of thermophore assures the ultimate passage of all of the particles through the zone wherein the oxygen is introduced and at which zone any small deposits of carbon are burned and pass upwardly into the reaction zone. It is moreover quite significant that this action involves no detriment to the operation since the carbon monoxide and dioxide thus formed are utilizable in the process. Of course appropriate adjustment may be made by the operator in the rate of fresh carbon dioxide feed in order to maintain that predetermined balance of feed materials which will not upset the desired composition of the effluent product gas.

While reference has been made to the introduction of relatively pure streams of feed gas to the several preheating passages it will be apparent that this is not essential since non-reacting feeds may be intermixed where desired, and even reactant gases may be mixed in proportions outside the explosive range. Thus, for example, the oxygen, $CO_2$ and water vapor may if desired be introduced in a mixed stream to a single preheating passage, and even methane with small percentages of oxygen, say 5%, may be preheated in admixture in a single passageway.

So also the invention is not limited to the use of totally gaseous reactants since any suitable gaseous feed may be preheated for intermixture with a suitable fluid reactant introduced to the reaction zone. One such arrangement is illustrated more or less symbolically by the dotted lines in Fig. 1 which represent an inlet pipe 34 adapted to introduce, for example, a liquid hydrocarbon fraction to a distributor head 35. The hydrocarbon fraction may be preheated and injected into the generator in the form of a vapor or liquid where it will become completely admixed and gasified by reaction with the upflowing streams of gaseous reactants from the lower preheating passages.

While the invention in its preferred aspect contemplates the use of a plurality of preheating passageways, nevertheless in its broadest though less advantageous aspect, it is possible to inject a feed as at 34 and 35 while supplying a single preheating stream of gaseous reactant from the lower or preheating section of the generator. It may be desirable to blanket the lowermost portion of the generator by means of a limited flow of inert or relatively inert gas which may be advantageously admitted from any suitable source, not shown, through the distributing means 35a represented by the dotted lines in Fig. 1. This arrangement overcomes any tendency for the several feed streams to diffuse into the bottom of the chamber and to create an undesired mixture of reactants at this point. Only a relatively small flow of blanket gas is required to effect this result and may advantageously involve one of the less reactive feed gases such as the $CO_2$ or steam. In fact, this arrangement is of particular advantage in affording good control of the level to which the methane for example is preheated. Thus by apportioning an increasing part of the total $H_2O$ or $CO_2$ flow to the distributor 35a, the methane will be diluted and any tendency toward cracking and carbon deposition will be minimized.

Yet another embodiment is disclosed in Fig. 3 wherein the construction positively assures the separation of the several gases during preheating. In accordance with this arrangement an upper or reaction chamber 36 is supplied with the downcoming stream of thermophore from an inlet pipe 37 supplied with a circulating stream of thermophore in substantially identically the same manner as the embodiment disclosed in Fig. 1. The reaction is completed within the zone C as before and preheating of the thermophore takes place in zone D. An outlet standpipe 38 divides into separate or branched standpipes 39 and 40 which supply separate preheating chambers 41 and 42 through respective star feeders 43 and 44. The downwardly circulating streams of thermophore in the two preheating chambers 41 and 42 pass countercurrently to upwardly moving streams of inlet feed gases introduced through inlet pipes 45 and 46, respectively, and withdrawn at the top of the respective preheating chambers through outlet pipes 47 and 48.

A pair of outlet standpipes 49 and 50 controlled by star feeders 51 and 52 in turn direct the streams of thermophore into a common hopper 53 where it is picked up by screw feeder 21 and returned to chamber 36 as before indicated.

The preheated streams of feed gas pass into a suitable mixing nozzle 54 for injection into the lower portion of the reaction chamber 36 where the reaction occurs.

In the operation of this embodiment it will be apparent that the feed gases are preheated in separate chambers free from any possibility of intermixture. Thus the several feeders 43, 44, 51 and 52, being substantially gas-tight, maintain the preheated streams apart until they reach the mixing nozzle 54 from which the mixture passes into the reaction zone. While only two preheating chambers are disclosed in the embodiment of Fig. 3, nevertheless, it will be understood that any desired or suitable number of such elements may be employed and the stream of thermophore from the reaction zone may be split or proportioned as desired in order to preheat the gaseous streams in accordance with the principles outlined above.

It may be particularly advantageous in practicing the invention to use a thermophore which is, or comprises a suitable catalyst for the reaction in question. Thus, for example, in the exothermic oxidation of hydrocarbons, nickel oxide has become recognized as a desirable catalyst. The desired effect may be achieved by precipitating nickel hydroxide upon a relatively inert support, such as alumina or any suitable refractory material heretofore mentioned. In short, a nickel-type catalyst thus supported may be employed instead of a completely inert thermophore and may be caused to gravitate through the several successive zones in the same manner and for the same purposes as hereinbefore mentioned.

In some instances where a catalyst is employed, the reaction temperatures need not be as high as otherwise, although they are preferably maintained above 1500° F., as for example in the range of 1650 to 1850° F. or higher.

While reference has been made to oxygen as a reactant gas, it will be understood that this term in its broadest sense contemplates mixtures including for instance air. On the other hand it is quite important to understand that in the case of oxidation of hydrocarbons, pure oxygen is a desirable feed from the standpoint of eliminating dilution or contamination by nitrogen or other impurities and simplifying subsequent operations, e. g., synthesis of liquid hydrocarbons. In any event it is advantageous to employ an oxygen feed of at least 35% purity, and preferably at least 95% purity.

While the apparatus has been disclosed more or less diagrammatically for convenience of description, it is usually highly desirable to provide suitable insulation for the several chambers and interconnected conduits and conveying means to preserve the overall heating efficiency of the device. So also it will be desirable and advantageous to line portions at least of the system particularly the reaction generation chamber with a refractory or brick of high-temperature resistance.

The present invention provides a simple and effective method and apparatus which may be compactly constructed as a single unit in order to conserve and utilize the available heat of an exothermic reaction in maintaining optimum temperature conditions for the reaction. It is particularly advantageous in operating at the high temperatures and under conditions where a substantial proportion of endothermically reacting feed materials are used in a net exothermically operating process.

Obviously many modifications and variations of the invention as set forth above may be made without departing from the spirit and scope thereof and therefore only such limitations should be imposed as are indicated in the appended claims.

I claim:

1. In the generation of a synthesis gas composed essentially of hydrogen and carbon monoxide by the high temperature reaction of reactants comprising a gasiform hydrocarbon and oxygen, continuously transporting a stream of solid heat carrier bodies through a high temperature gas generation zone where said bodies are raised to a high temperature, the stream of hot heat carrier bodies from the generation zone is thereafter divided into a plurality of separate streams, said separate streams of heat carrier bodies are conducted through separate preheating zones, the separate streams of heat carrier bodies from the preheating zones are rejoined and returned to the inlet of the gas generation zone, continuously feeding each said reactant separately to each of said preheating zones, passing each reactant countercurrently in contact with the hot stream of heat carrier bodies in the respective preheating zone to effect a separate preheat thereof, intermingling the preheated reactants from the individual preheating zones, effecting reaction of the intermingled reactants in said generation zone to form a reaction product composed essentially of hydrogen and carbon monoxide and liberate substantial quantities of heat in contact with the heat carrier bodies therein, and withdrawing the desired product gas from the gas generation zone.

2. The method according to claim 1 wherein the separately preheated reactants from each of the preheating zones pass directly into said gas generation zone.

3. In an apparatus for conducting a high temperature exothermic reaction of gasiform reactants, a vertically extending vessel adapted to receive a moving bed of solid particle heat carrier bodies, a conveyor operatively connected to continuously convey solid heat carrier bodies from the bottom of said vessel to the top thereof, the interior of said vessel forming an internal chamber having an upper section and a lower section, the lower section of said chamber being divided by an upstanding partition member separating said lower section into vertically extending compartments merging at their upper extremities with the upper section of the chamber, means for introducing a separate stream of gaseous reactant into the lower portion of each of said compartments, and means for withdrawing desired product gas at the upper portion of said chamber.

4. In the generation of carbon monoxide and hydrogen by the high temperature reaction of a plurality of reactants comprising a gasiform hydrocarbon and oxygen and a reactant selected from the group consisting of carbon dioxide and water vapor in proportions operative to react with net liberation of heat, the steps which comprise continuously transporting a stream of solid heat carrier bodies through a high temperature reaction zone wherein said hydrogen and carbon monoxide are generated and said heat carrier bodies raised to a high temperature, withdrawing hot heat carrier bodies from the reaction zone as a plurality of separate streams which are conducted through separate preheating zones, thereafter returning the heat carrier bodies from the preheating zones to the reaction zone, continuously feeding said reactants to separate preheating zones and passing each reactant countercurrently in contact with a stream of heat carrier bodies in the respective reactant preheating zone to effect a separate preheat thereof, intermingling the preheated reactants from the individual preheating zones and effecting reaction of the intermingled reactants in said reaction zone to form carbon monoxide and hydrogen and liberate substantial quantities of heat in contact with the heat carrier bodies therein, and withdrawing the resulting product gas from the reaction zone.

5. A process as defined in claim 4 wherein said heat carrier bodies comprise a nickel-type catalyst for the reaction.

6. In the generation of carbon monoxide and hydrogen by the high temperature reaction of a plurality of reactants comprising a gasiform hydrocarbon and oxygen and a reactant selected from the group consisting of carbon dioxide and water vapor in proportions operative to react with net liberation of heat, the steps which comprise continuously transporting a stream of solid heat carrier bodies through a high temperature reaction zone wherein said hydrogen and carbon monoxide are generated and said heat carrier bodies raised to a high temperature, withdrawing hot heat carrier bodies from the reaction zone as a plurality of separate streams which are conducted through separate preheating zones, thereafter returning the heat carrier bodies from the preheating zones to the reaction zone, continuously feeding said reactants to separate preheating zones and passing each reactant countercurrently in contact with a stream of heat carrier bodies in the respective reactant preheating zone to effect a separate preheat thereof, intermingling the preheated reactants from the individual preheating zones and effecting reaction of the intermingled reactants in said reaction zone to form carbon monoxide and hydrogen and liberate substantial quantities of heat in contact with the heat carrier bodies therein, subjecting said heat carrier bodies to preheating in a solids preheating zone in advance of said reaction zone by countercurrent passage of gaseous products of reaction in heat exchange with said solid heat carrier bodies prior to their introduction into the reaction zone, and withdrawing the desired product gas from said solids preheating zone.

PERCIVAL C. KEITH.

References Cited in the file of this patent

UNITED STATES PATENTS

| Number | Name | Date |
|---|---|---|
| 2,135,693 | Bardwell et al. | Nov. 8, 1938 |
| 2,399,450 | Ramseyer | Apr. 30, 1946 |
| 2,432,503 | Bergstrom et al. | Dec. 16, 1947 |
| 2,486,627 | Arnold | Nov. 1, 1949 |
| 2,532,514 | Phinney | Dec. 5, 1950 |

FOREIGN PATENTS

| Number | Country | Date |
|---|---|---|
| 525,197 | Great Britain | Aug. 23, 1940 |

OTHER REFERENCES

Trinks, "Industrial Furnaces," 2d edition, vol. II, page 297.

Haslam et al.: "Fuels and Their Combustion," page 150.